(12) United States Patent
Beuschel et al.

(10) Patent No.: US 12,553,532 B2
(45) Date of Patent: Feb. 17, 2026

(54) PNEUMATIC VALVE WITH AN SMA ACTUATOR

(71) Applicant: Conti Temic microelectronic GmbH, Ingolstadt (DE)

(72) Inventors: Michael Beuschel, Stammham (DE); Johann Steinberger, Brunnen (DE); Stefan Bauer, Engelbrechtsmünster (DE)

(73) Assignee: Conti Temic microelectronic GmbH, Ingolstadt (DE)

( * ) Notice: Subject to any disclaimer, the term of this patent is extended or adjusted under 35 U.S.C. 154(b) by 0 days.

(21) Appl. No.: 18/820,924

(22) Filed: Aug. 30, 2024

(65) Prior Publication Data

US 2025/0075819 A1 Mar. 6, 2025

(30) Foreign Application Priority Data

Aug. 31, 2023 (DE) ...................... 10 2023 208 359.0

(51) Int. Cl.
*F16K 31/00* (2006.01)
*F16K 31/56* (2006.01)
(Continued)

(52) U.S. Cl.
CPC ............ *F16K 31/002* (2013.01); *F16K 31/56* (2013.01); *F16K 41/103* (2013.01); *F03G 7/06143* (2021.08)

(58) Field of Classification Search
CPC .. F16K 31/002; F16K 41/103; F16K 41/3156; F16K 11/022; G03G 7/06143
See application file for complete search history.

(56) References Cited

U.S. PATENT DOCUMENTS 3,761,050 A * 9/1973 Puster ................... F16K 11/022
251/61
9,080,682 B2 7/2015 Deperraz et al.
(Continued)

FOREIGN PATENT DOCUMENTS

DE 4331515 A1 3/1995
DE 4331568 C2 10/2001
(Continued)

OTHER PUBLICATIONS

Office Action mailed on Jul. 7, 2024 from corresponding German patent application No. 10 2023 208 359.0.

*Primary Examiner* — Umashankar Venkatesan

(57) ABSTRACT

A pneumatic valve features a fluid supply port, a fluid outlet port, and a fluid drainage opening. The valve includes a valve chamber with fluid supply, outlet, and trigger openings, and an actuator chamber connected to the trigger opening. An actuator with an SMA wire, actuating and resetting elements, and a printed circuit board is housed within the valve. A sealing element on the actuating element controls the trigger opening, while a membrane divides the valve chamber into two regions and facilitates plunger movement. The plunger connected to the membrane closes the fluid outlet opening in the unactuated state and opens it in the actuated state. The membrane includes a passage opening for fluid flow between the regions, with a smaller cross-section than the trigger opening, facilitating controlled fluid flow within the valve.

15 Claims, 7 Drawing Sheets

(51) Int. Cl.
*F16K 41/10* (2006.01)
*F03G 7/06* (2006.01)

(56) References Cited

U.S. PATENT DOCUMENTS

| | | | | |
|---|---|---|---|---|
| 10,207,619 B2 * | 2/2019 | Dankbaar | ............. | F16K 31/002 |
| 10,753,494 B2 * | 8/2020 | Beuschel | ............. | F16K 11/052 |
| 10,995,873 B2 * | 5/2021 | Mitzler | ................. | B60N 2/914 |
| 11,047,497 B2 * | 6/2021 | Beuschel | ............ | F03G 7/06143 |
| 11,073,219 B2 * | 7/2021 | Dörfler | .................... | B60N 2/99 |
| 11,077,781 B2 * | 8/2021 | Beuschel | ............. | F16K 11/044 |
| 11,236,839 B2 * | 2/2022 | Beuschel | ............. | F16K 31/002 |
| 11,859,727 B2 * | 1/2024 | Beuschel | ............... | B60N 2/914 |
| 12,352,365 B1 * | 7/2025 | Wen | ...................... | F16K 31/025 |
| 12,416,369 B2 * | 9/2025 | Beuschel | ............... | F16K 31/02 |

FOREIGN PATENT DOCUMENTS

| | | |
|---|---|---|
| DE | 102017116841 A1 | 1/2019 |
| DE | 102017125283 A1 | 5/2019 |
| DE | 102018216874 A1 | 4/2020 |
| DE | 102018131802 A1 | 6/2020 |
| DE | 102019209703 A1 | 1/2021 |
| DE | 102019208051 B4 | 7/2022 |
| EP | 3078890 B1 | 3/2018 |

\* cited by examiner

PNEUMATIC VALVE WITH AN SMA ACTUATOR

BRIEF DESCRIPTION OF THE DRAWINGS

The subject matter of the disclosure will be explained in more detail below on the basis of exemplary embodiments with the aid of figures, in which.

DETAILED DESCRIPTION

Figure 1:
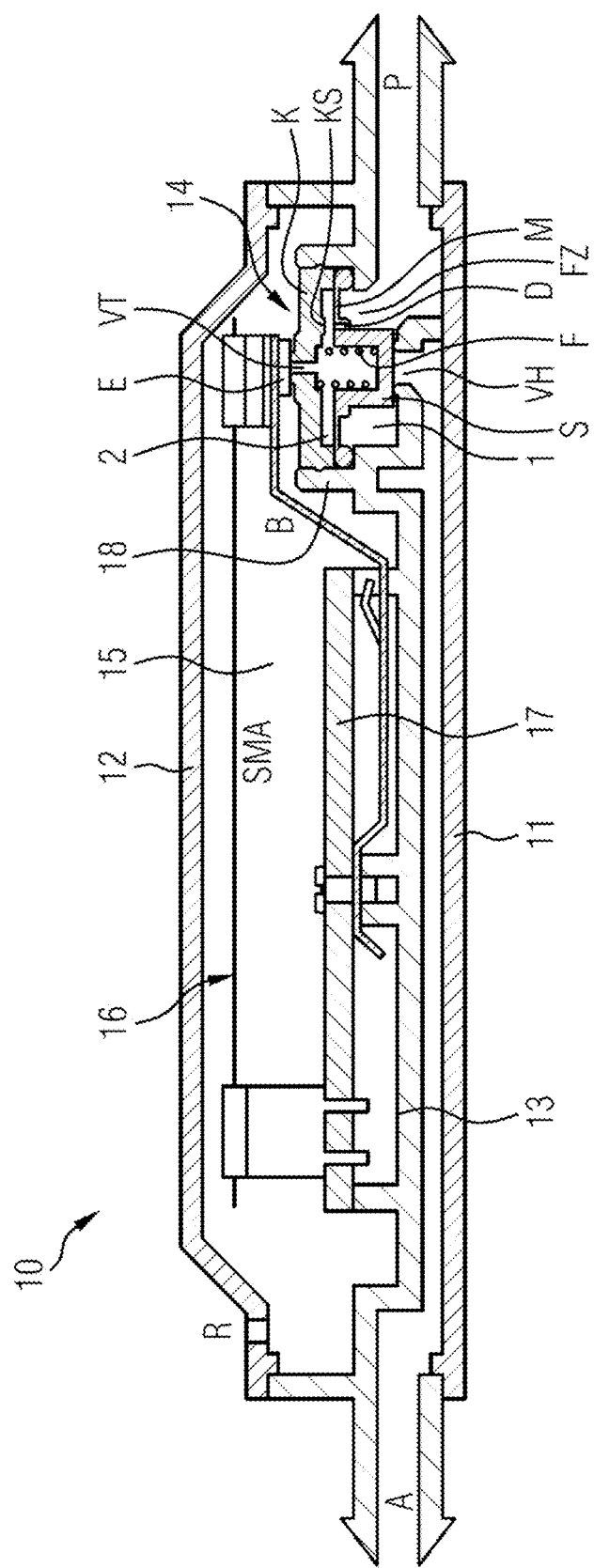
FIG. 1 shows an exemplary pneumatic valve according to the disclosure.

The disclosure relates to a pneumatic valve having a fluid supply port, a fluid outlet port and a fluid drainage opening, having a valve chamber with a fluid supply opening, which is connected to the fluid supply port, with a fluid outlet opening, which is connected to the fluid outlet port, and with a trigger opening, which is connected to an actuator chamber of the valve which has the fluid drainage opening. The valve is formed with an actuator, which is formed with an SMA wire, an actuating element, a resetting element, and a printed circuit board, which is arranged in the actuator chamber. The valve furthermore has a membrane, which divides the valve chamber into two regions, a first region being connected to the trigger opening and a second region being connected to the fluid outlet opening, wherein the membrane is connected to a plunger which, because of a spring force in the unactuated state of the actuator, is pressed against a fluid opening and closes the latter and, in the actuated state of the actuator, opens up the fluid opening by a fluid flowing through the fluid supply opening. The membrane has at least one passage opening through which fluid can flow from the second region into the first region.

Such a pneumatic valve is known from DE 10 2019 208 051 B4. There, the membrane closes the fluid supply opening of the valve chamber, while the fluid outlet opening is continuously open. A plunger which is actuated by the leaf spring and is connected to the membrane protrudes through the trigger opening in order, in the unactuated state, to press said membrane against the fluid supply opening. The trigger opening is closed by the membrane in the actuated state of the actuator, but the trigger opening is open in the unactuated state, and therefore fluid from a consumer connected to the fluid outlet port, for example, a bladder to be filled with fluid—for example, air—is discharged via the fluid outlet port, holes in the membrane and the trigger opening into the actuator chamber and from there into the environment via the fluid outlet opening. This is therefore a 3/2 NC valve.

In the case of a similarly designed valve according to DE 10 2018 216 874 A1, the air also has to flow serially through two nozzle openings during the filling operation, and therefore, because of the additional flow resistance, the volumetric flow rate is reduced compared to a single nozzle passage.

Such pneumatic valves are used to control a fluid flow for filling elastic cushions in vehicles for forming seat contours. For this purpose, the elastic cushions are generally filled with air as a fluid.

As an actuator for such valves, shape memory wire (SMA=shape memory alloy) is increasingly being used, which shortens in length in the event of current flow and the resulting heating.

For the high volumetric flow rate required for some functions, such as cushion adjustment, depending on driving dynamic states, large valve cross sections and thus high actuating and sealing forces are required for them. An SMA actuator that can provide them requires appropriately large dimensioning, as a result of which costs and space requirements increase.

By connection of a plurality of individual valves in parallel, the volumetric flow rate can be scaled. However, costs and installation space are therefore also correspondingly increased.

By way of example for a multiplicity of industrial valves, DE 43 31 568 C2 and DE 43 31 515 A1 respectively disclose servo and pilot solenoid valves which are actuated with an auxiliary flow and control a greater pressure or volumetric flow rate with little actuating effort.

U.S. Pat. No. 9,080,682 B2 discloses a valve, in which SMA wires, via a deflection, activate two pilot control valves for actuating a main valve. The deflection is guided by a sealing element, which reduces the available actuating force of the SMA wire.

EP 3 078 890 B1 also discloses a pilot valve actuated by an SMA wire. The SMA wire is located in the pressure range of the working port of the main valve; therefore, the associated electrical contacts have to be airtight, which increases the outlay and thus the costs.

DE 10 2019 209 703 A1 discloses a pneumatic valve for a fluid bladder of a pneumatic adjustment device of a vehicle seat, which has a first valve chamber, which is connectable to a fluid source, a separate second valve chamber, which is connectable to the fluid bladder, a separate third valve chamber, which is connectable to an environment of the pneumatic valve, a separate fourth valve chamber, which is connected in terms of fluid via a first fluid passage to the first valve chamber, via a second fluid passage to the second valve chamber, and via a third fluid passage to the third valve chamber, and a shut-off element which is arranged in the fourth valve chamber and is movable between a first position, in which the first fluid passage and the second fluid passage are open and the third fluid passage is closed, and a second position, in which the first fluid passage and the second fluid passage are closed and the third fluid passage is open.

DE 10 2017 116 841 A1 discloses a valve with a valve housing, which comprises a housing cover, a housing bottom and an intermediate housing arranged between the housing cover and the housing bottom, wherein the valve housing encloses a valve chamber, which comprises a flow chamber and an actuating chamber, wherein the valve housing has at least one valve opening leading from the flow chamber into the actuating chamber, and wherein within the actuating chamber there is arranged at least one adjustment element, which is axially movable between a closing position for closing the valve opening and an open position for opening up the valve opening, a wire- or strip-shaped SMA element, which is used to actuate the adjustment element in the opening direction and is formed from a shape memory alloy, a resetting element serving for moving the adjustment element in the closing direction, and a printed circuit board, wherein the SMA element is fixed with a central section to the adjustment element and is electrically connected at its ends to the printed circuit board for the application of current, wherein the flow chamber and the actuating chamber are separated from each other in such a way by a partition having the valve opening that a fluid flowing through the valve when the adjustment element is actuated is conducted through the flow chamber.

DE 10 2017 125 283 A1 relates to a valve system for a fuel tank, in particular valve system for monitored and/or controlled and/or regulated discharge or introduction of a fluid, preferably gas or air or air enriched or saturated with hydrocarbons, from or into the fuel tank, comprising a housing having a tank port for connecting the valve system to a fuel tank, and having a filter port for connecting the valve system to an activated carbon filter, and/or having a filler pipe port for connecting the valve system to a filler pipe of the fuel tank, wherein the tank port and the filter port or the tank port and the filler pipe port are fluidically connected or connectable to each other via a main ventilation duct, wherein in the main ventilation duct at least one main ventilation valve is arranged with a valve element, which closes the main ventilation duct in a closing position and opens up same in an opening-up position, wherein either the tank port or a tank-side main ventilation duct and the filter port or a filter-side main ventilation duct and/or the tank port or the tank-side main ventilation duct and the filler pipe port or a filler pipe-side main connection duct are fluidically connected or connectable to each other via an auxiliary ventilation duct, wherein at least one valve group with at least one auxiliary ventilation valve, which closes or opens up the auxiliary ventilation duct, is arranged in the auxiliary ventilation duct.

DE 10 2018 131 802 A1 describes a valve for a cleaning system, comprising a valve housing with a pump port and a consumer port, furthermore comprising a main valve and a control valve and an electronic chamber, which are incorporated in the valve housing, wherein the control valve has a control valve input with a control valve input chamber and a control valve output with a control valve output chamber, wherein the control valve input is fluid-connected to the pump port and the control valve output is fluid-connected to a valve housing output, wherein the control valve furthermore comprises a control valve body, an actuator with a motion transmission element, a movable valve element, and a sealing element, which is connected to the movable valve element, wherein the motion transmission element extends through a through hole from the electronic chamber to the control valve body, wherein the actuator can bring the control valve into a closing position, in which there is no fluid connection between the control valve input and control valve output through the control valve body, and can bring same into an opening position, in which there is a fluid connection between the control valve input and control valve output through the control valve body, wherein the main valve is opened by opening the control valve and the main valve is closed by closing the control valve.

It is therefore the object of the disclosure to specify a compact pneumatic valve with a large nozzle cross section. An SMA actuator for actuation is intended to be loaded as little as possible in respect of force and travel. It is intended, in addition, for no outlay on sealing to be necessary for the ports of the SMA actuator.

Accordingly, in an embodiment, the pneumatic valve according to the disclosure is formed with a fluid supply port, a fluid outlet port and a fluid drainage opening. It has a valve chamber with a fluid supply opening, which is connected to the fluid supply port, with a fluid outlet opening, which is connected to the fluid outlet port, and with a trigger opening, which is connected to an actuator chamber of the valve which has the fluid drainage opening. It is also formed with an actuator, which is formed with an SMA wire, an actuating element, a resetting element, and a printed circuit board, which is arranged in the actuator chamber, wherein a sealing element is arranged on a movable part of the actuating element, said sealing element being pressed against the trigger opening by the resetting element in the non-actuated state of the actuator and opening up the trigger opening in the actuated state of the actuator. The valve chamber is divided by a membrane into two regions, a first region being connected to the trigger opening and a second region being connected to the fluid outlet opening, wherein the membrane is connected to a plunger which, because of a spring force in the unactuated state of the actuator, is pressed against the fluid outlet opening and closes the latter and, in the actuated state of the actuator, is pushed away from the fluid outlet opening by a fluid flowing through the fluid supply opening and opens up the fluid outlet opening, wherein the membrane has at least one passage opening through which fluid can flow from the first region into the second region, the passage opening having a smaller cross section than the trigger opening.

In the unactuated state, the valve chamber of the pneumatic valve is thus connected to the air supply via the fluid supply port, with the same pressure being set both in the first and in the second region of the valve chamber, and therefore the membrane not being loaded, because of the passage opening in the membrane. In the actuated state, the actuator opens the trigger opening, and therefore air can escape from the first region into the actuator chamber and from there into the environment. Owing to the higher pressure in the second region, the plunger, which is connected to the membrane, is lifted off the fluid outlet opening counter to the spring force because of the effective area of the membrane, and therefore the air can flow through the valve into a connected consumer—for example, a cushion. Thus, only a small force is necessary for actuating the SMA actuator, since the pressure of the inflowing air is used to open the valve. Since the passage opening has a smaller cross section than the trigger opening, the compressed air flowing into the second region cannot pass into the first region quickly enough, and therefore a greater pressure prevails in the second region as long as the trigger opening is opened up.

The actuating element can be designed as a leaf spring, which acts simultaneously as a resetting element. A non-movable end of the actuating element (bending section) can be connected to the printed circuit board and the movable end (actuating section) can be connected to the SMA wire.

It is also possible to realize the resetting element with a spiral spring, as is shown, for example, in DE 10 2018 216 874 A1.

In one embodiment of the pneumatic valve, the valve chamber is formed with a cover element having the trigger opening. Said cover element can be latched into a housing wall forming the valve chamber, and therefore a tight chamber is formed, which can also absorb the forces of the spring.

In one embodiment of the pneumatic valve, the spring force applied to the plunger can be generated by a spiral spring, which is arranged between the plunger and the cover element. However, it is also conceivable to design the membrane as a spring element. The spring force has to be dimensioned such that, on the one hand, the fluid outlet opening can be securely closed but, on the other hand, the pressure of the inflowing air is sufficient to lift off the plunger from the fluid outlet opening when the trigger opening is opened up.

Advantageously, the entire fluid line from the pressure supply up to and including the fluid supply opening has a larger cross section than the fluid outlet opening, and therefore the pressure in the first region of the valve chamber substantially corresponds to the pressure of the inflowing air even when the fluid outlet opening is open.

In a further embodiment of the pneumatic valve, the plunger may have a cup-shaped region in which the spiral spring is mounted. Alternatively, the plunger may have a pin-shaped region around which the spiral spring is arranged.

In a development of the pneumatic valve, in the region next to the trigger opening, the valve chamber has a web against which the region of the membrane, in which the passage opening is situated, is pressed by the inflowing fluid in the activated state of the actuator.

This reduces the working air flow and thus the pressure difference between the second and the first region until an equilibrium between the compressive force and the spring force is achieved. However, even when the passage opening is present at the web, it has to be ensured structurally that a minimum working air flow is maintained, which is important for the rapid completion of the filling operation. When the valve is not actuated, the arrangement also does not consume any working air.

Advantageously, the SMA wire and a bending section of the actuating element—for example, a leaf spring—can be arranged on opposite sides of the printed circuit board.

In a development of the pneumatic valve, the membrane is clamped between the cover element and a cup-shaped element of the valve chamber receiving the cover element, as a result of which a simple assembly is achieved.

For particularly good sealing, the cover element can have a projection at its edge which is in contact with the membrane, as a result of which the membrane is additionally held by a form fit.

The membrane can be connected integrally to the plunger. However, the membrane and the plunger may also be manufactured from different parts which are connected to one another.

The cross section of the trigger opening is advantageously smaller than the cross section of the fluid outlet opening. By this means, the associated SMA actuator requires only a small travel and a limited force for actuation. This is of benefit for the service life (in particular the number of actuation cycles) of the SMA wire.

In a further embodiment of the pneumatic valve, the effective area of the membrane is larger than the cross section of the fluid outlet opening. This enables the main valve to be opened against a high preliminary pressure and against the force of the spring, even in the event of an unpressurized consumer. The pressure supply provides the additional energy for the opening. The preliminary pressure can vary over a wide range; it merely has to be at least of a magnitude such that the compressive force on the membrane is greater than the resetting force of the spring.

In a development of the pneumatic valve, the fluid outlet opening of the valve chamber is connected to the fluid outlet port via a further valve element. This enables a 3/3 valve to be realized.

If the further valve element is open in its unactuated state, the pneumatic valve is realized as a 3/3 NO valve.

If, on the other hand, the further valve element is closed in its unactuated state, the pneumatic valve is formed as a 3/3 NC valve.

FIG. 1 shows a cross-sectional illustration of a first exemplary embodiment of a pneumatic valve, which is formed with a housing 10, which has a first housing part 11, which is designed as a base plate in the illustrated exemplary embodiment. The housing 10 also has a second housing part 12, which is designed as a cover, and, finally, a third cup-shaped housing part 13, which is designed as an insert part between the first and the second housing parts 11, 12 and on which a fluid supply port P and a fluid outlet port A are integrally formed. In the second housing part 12, a fluid drainage opening R is formed, which connects an actuator chamber 15, which is formed between the second housing part 12 and the third housing part 13 and in which an actuator 16 is arranged, to the environment such that openings for electrical connections of the actuator do not have to be sealed.

A valve chamber 14 is formed on the third housing part 13 by the latter having a pot-shaped molding into which a cover element K is inserted as a cover of the valve chamber 14. The valve chamber 14 has a fluid supply opening FZ, a fluid outlet opening VH acting as the main valve, and a trigger opening VT. In the illustrated exemplary embodiment, the fluid supply opening FZ and the fluid outlet opening VH are formed in the third housing part 13 and the trigger opening VT is formed in the cover element K closing the valve chamber 14.

It is thus possible for compressed air to be guided via the fluid supply opening FZ, for example, from a compressor, into the housing 10, wherein the compressed air can pass via the fluid supply opening FZ into the valve chamber 14 and from there via the fluid outlet opening VH and the fluid outlet port A into a consumer, for example an air cushion, which is connectable thereto.

Figure 2:
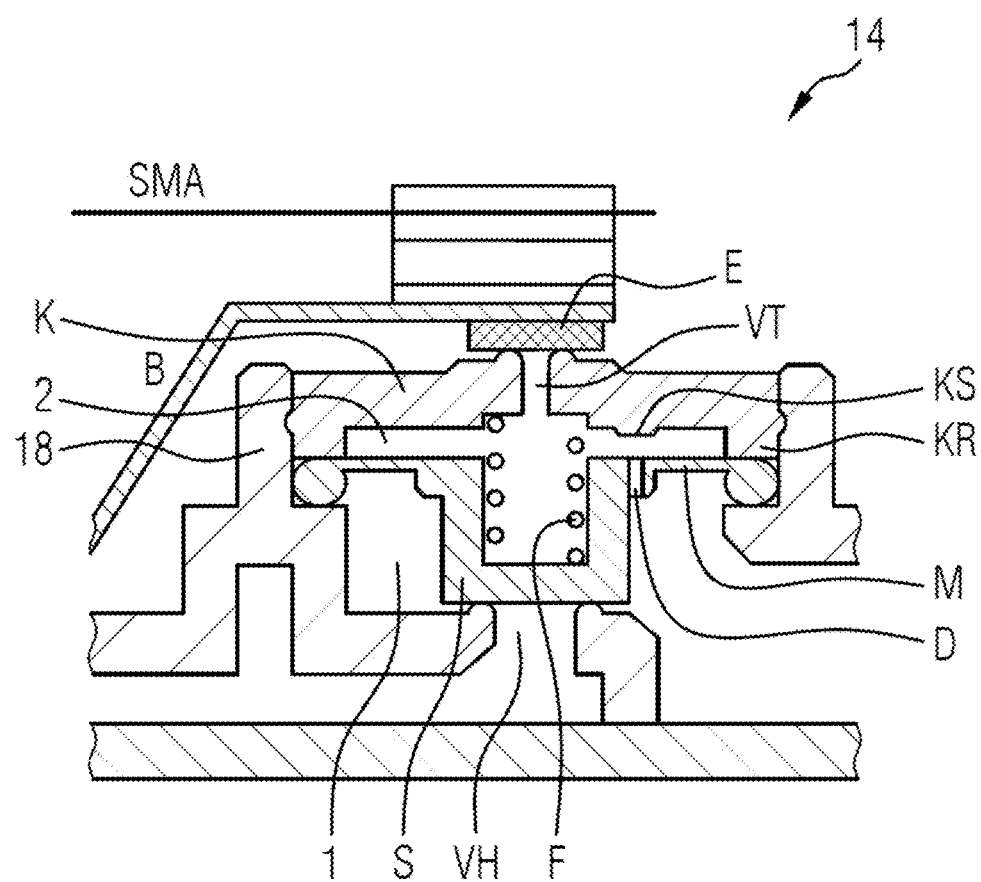
FIG. 2 shows an exemplary valve chamber in a detailed view.

As can be seen in detail in FIG. 2, an elastic membrane M divides the valve chamber 14 into a lower, first region 1, in the illustration of the figures, and an upper, second region 2. The first region 1 is connected to the fluid supply opening FZ and thus to the fluid supply port P. The second region 2 is closed air-tightly by a cover element K in relation to the actuator chamber 15 and thus in relation to the environment. The membrane M has a small passage opening D, which permits a limited air flow (working air) from the first region 1 into the second region 2 of the valve chamber 14.

The membrane M is connected to a plunger S. The plunger S has a sealing surface on its underside in order to close the nozzle seat of the fluid outlet opening VH in its lower end position. The plunger S can be manufactured from an elastic material integrally with the membrane M or else can be a component assembled with the plunger S. An elastic element F, e.g. a spring, which is attached between the cover element K and the plunger S, generates a resetting force for closing the fluid outlet opening VH by means of the plunger S. The elastic element F can optionally also be formed with the membrane M, which, by means of its inherent stress, pulls the plunger S into the lower end position closing the fluid outlet opening VH.

An associated SMA actuator consists of a leaf spring B and an SMA wire SMA, wherein the leaf spring B has a bending section and an actuating section, which are respectively arranged on opposite sides of an electrical printed circuit board 17 and in the ambient pressure in the actuator chamber 15. The cover element K has the trigger opening VT, which acts as a trigger valve. A sealing element E, which can seal the trigger opening VT, is fastened to the underside of an actuating section of the leaf spring B.

Figure 3:
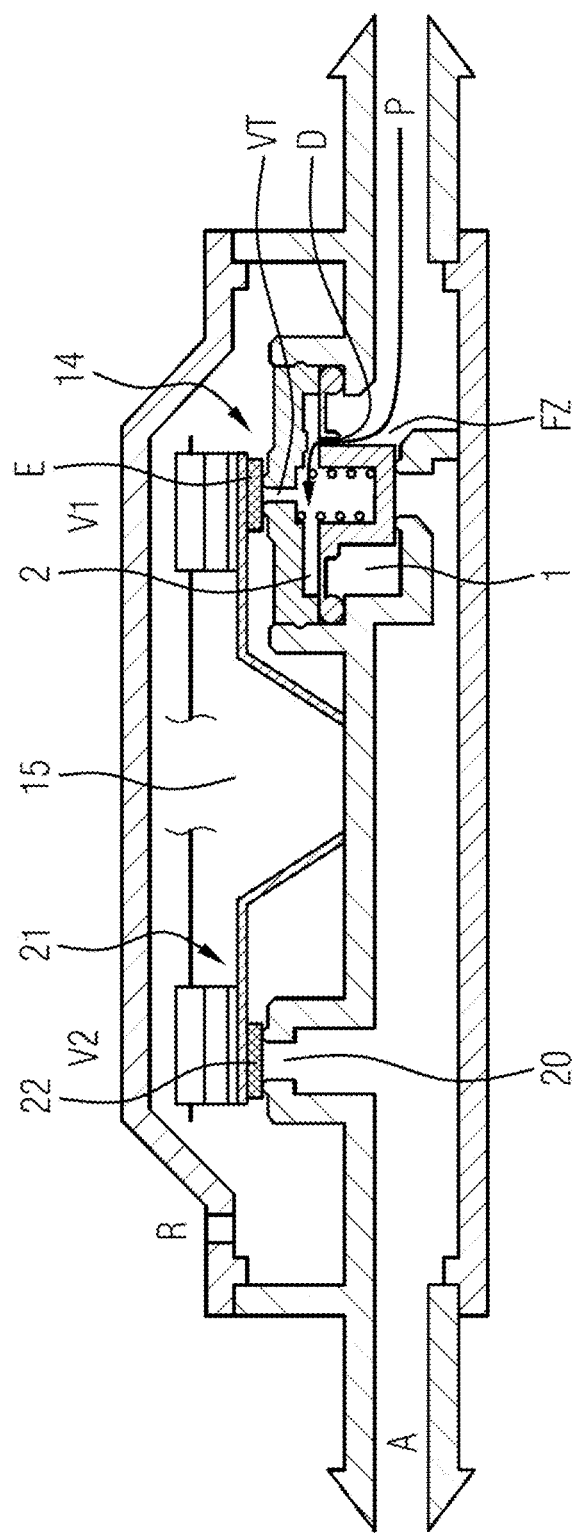
FIG. 3 shows an exemplary pneumatic valve in the deactivated state.
Figure 4:
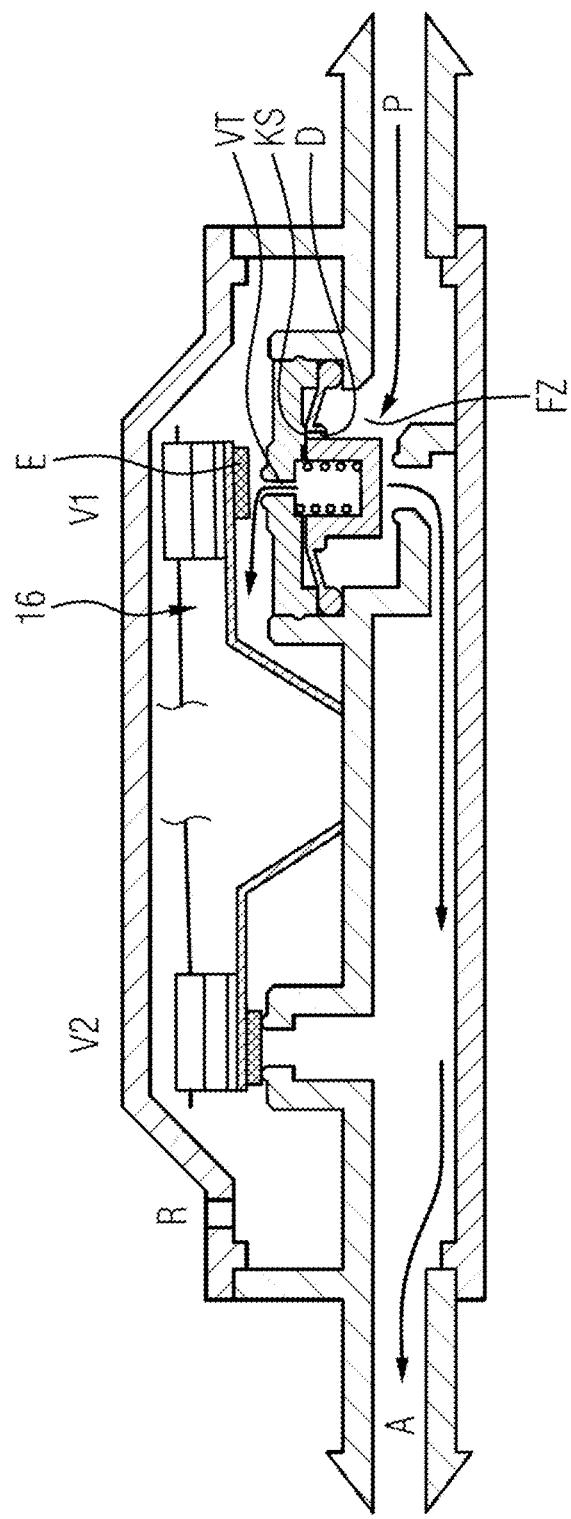
FIG. 4 shows an exemplary pneumatic valve in the activated state.
Figure 5:
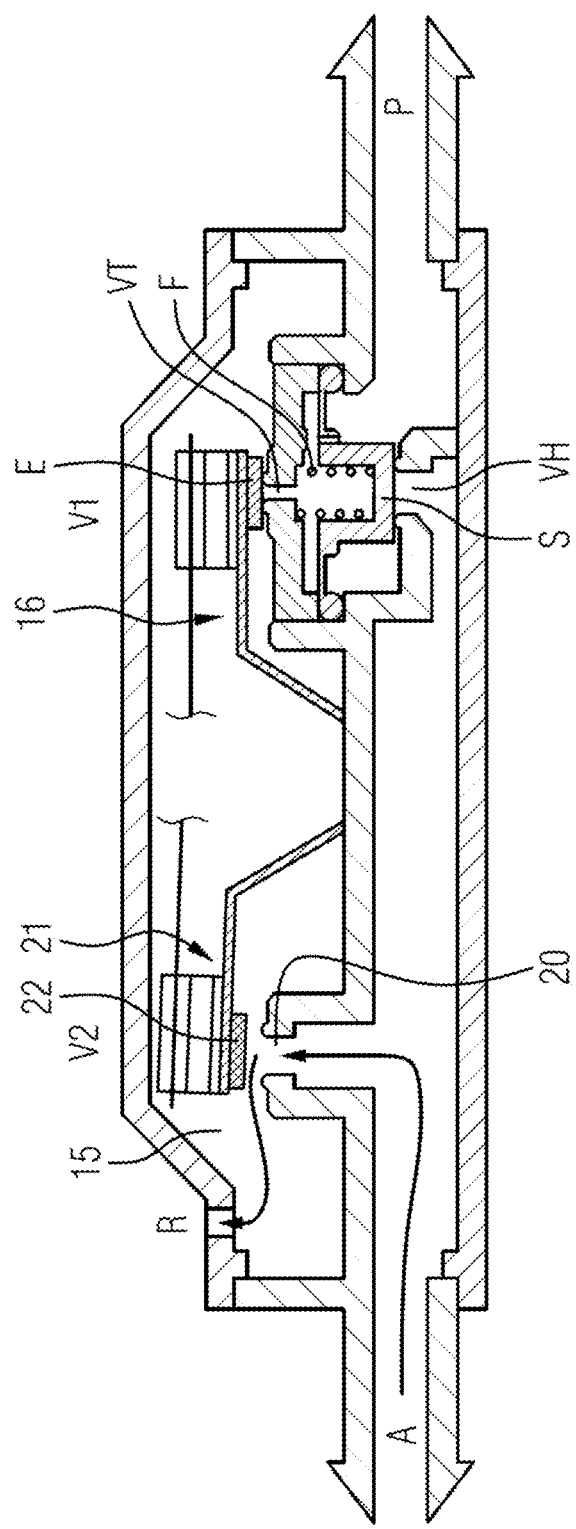
FIG. 5 shows an exemplary pneumatic valve as a 3/3 NC valve in the venting state.

FIGS. 3 to 5 illustrate a pneumatic valve as a 3/3 NC valve with two valve elements V1 and V2 in three different switching states. The first valve element V1 is formed with an above-described valve chamber 14 and the second valve element V2 is formed as a simple valve to be actuated by an SMA actuator 21 and having only one valve opening 20. A sealing element 22 arranged on the SMA actuator 21 closes the valve opening 20 in the unactuated state and opens it up in the actuated state.

In the "holding" state shown in FIG. 3 (i.e. the SMA actuator 16 of the first valve element V1 is not activated, see FIG. 3, right), the trigger opening VT is closed by the sealing element E. The lower region 1 and the upper region 2 of the valve chamber 14 are connected to each other via the passage opening D, and therefore the pressure is equalized. Thus, even at a high or variable pressure of the pressure supply at the fluid supply port P, no pneumatic force acts on the membrane M. The elastic element F designed as a spiral spring now pushes the plunger S, which is connected to the membrane M, against the nozzle seat of the fluid outlet opening VH and seals the latter. The force of the elastic element F is configured in such a way that, in the most unfavorable case (e.g. max. consumer pressure and min. supply pressure), it can apply compressive and sealing forces.

The second valve element V2 is not actuated in this state, i.e. in a closed state.

At the beginning of the "filling" state, as is illustrated in FIG. 4 (i.e. the SMA actuator 16 of the first valve element V1 is activated, see FIG. 4, right), the trigger opening VT is open. Preferably, although the cross section of the trigger opening VT is as small as possible, it is nevertheless substantially larger than the cross section of the passage opening D. As a result, the pressure in the second region 2 of the valve chamber 14 drops and approaches the ambient pressure. The pressure difference in relation to the supply pressure in the first region 1 of the valve chamber 14 now causes an upwardly directed force on the membrane M, as a result of which the plunger S opens the fluid outlet opening VH and thus the main valve.

Owing to the small cross section of the trigger opening VT compared to the cross section of the fluid outlet opening VH, the associated SMA actuator 16 requires only a small travel and a limited force for actuation. This is of benefit for the service life (in particular the number of actuation cycles) of the SMA wire SMA.

Preferably, the effective area of the membrane M is substantially larger than the cross section of the fluid outlet opening VH. Thus, even in the event of the consumer being unpressurized, the fluid outlet opening VH can be opened at the fluid outlet port A counter to a high preliminary pressure and counter to the force of the elastic element F. The pressure supply provides the additional energy for the opening ("servo valve"). The preliminary pressure can vary over a wide range; it merely has to be at least of a magnitude such that the compressive force on the membrane M is greater than the resetting force of the elastic element F.

Advantageously, the entire fluid line from the pressure supply up to and including the fluid supply opening FZ has a larger cross section than the fluid outlet opening VH, and therefore the pressure in the first region 1 of the valve chamber 14 substantially corresponds to the pressure of the pressure supply even when the fluid outlet opening VH is open.

During the "filling" state, a limited working air flow flows through the passage opening D and the open trigger opening VT from the pressure supply into the environment. When the membrane M is deflected to the maximum, the passage opening D optionally approaches a web KS in the cover element K. This reduces the working air flow and thus also the pressure difference between the lower region 1 and the upper region 2 until an equilibrium between the compressive force and the spring force is achieved.

Even when the passage opening D is present at the web KS, it has to be ensured structurally that a minimum working air flow is maintained, which is important for the rapid completion of the filling operation. When the valve is not actuated, the arrangement also does not consume any working air.

At the end of the filling operation (i.e. the SMA actuator 16 of the first valve element V1 is deactivated, see FIG. 3, right), the trigger opening VT is closed again. Via the passage opening D, the pressure between the first region 1 and the second region 2 of the valve chamber 14 is then equalized again.

The force of the elastic element F consequently also causes the fluid outlet opening VH to be closed again.

In a simple manner, the first valve element V1 can be combined with a second valve element V2 for venting a consumer in a known manner, as shown in FIG. 5. The depicted behavior of the valve arrangement thus corresponds to a 3/3 NC valve (normally closed).

In the venting state, the second valve element V2 is actuated via the associated SMA actuator 21 with SMA wire and leaf spring. A sealing element 22 also fastened to the leaf spring then opens the associated nozzle seat (left). This enables air from the consumer to flow into the environment.

Figure 6:
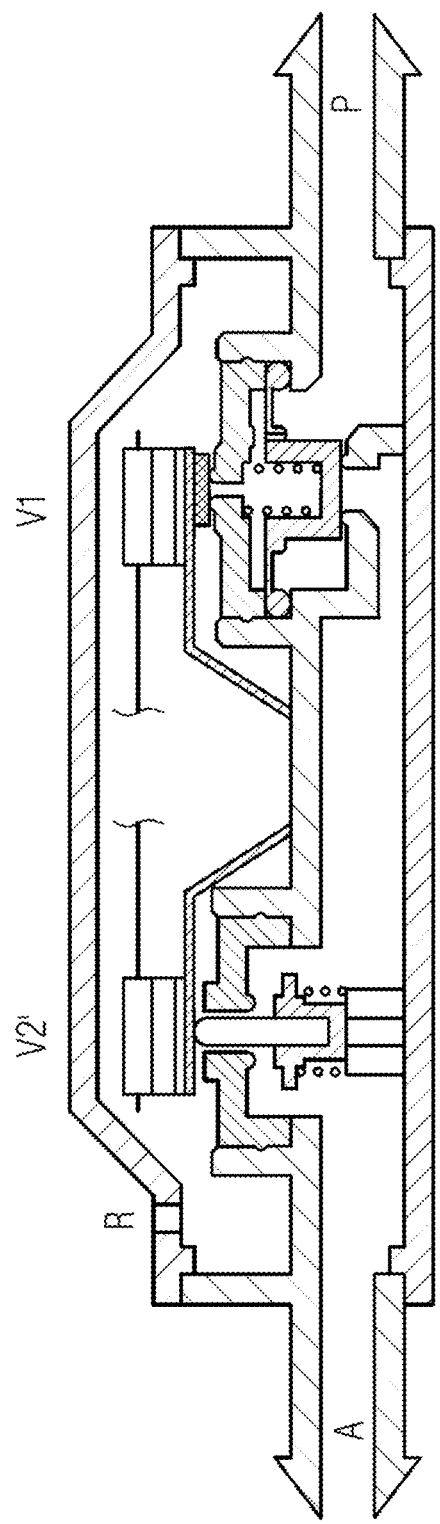
FIG. 6 shows an exemplary pneumatic valve as a 3/3 NO valve.

Similarly, the proposed first valve element V1 can be combined with a cup valve V2' (see FIG. 6, left). In the inoperative state (not activated), the additional cup valve V2', also with SMA actuator according to the prior art, connects a consumer attached to the fluid outlet port A to the environment via the fluid drainage opening R. When the SMA actuator is activated, a plunger with its sealing element located at the top closes the nozzle seat of the venting valve. The depicted behavior of the valve arrangement thus corresponds to a 3/3 NO valve (normally open).

Figure 7:
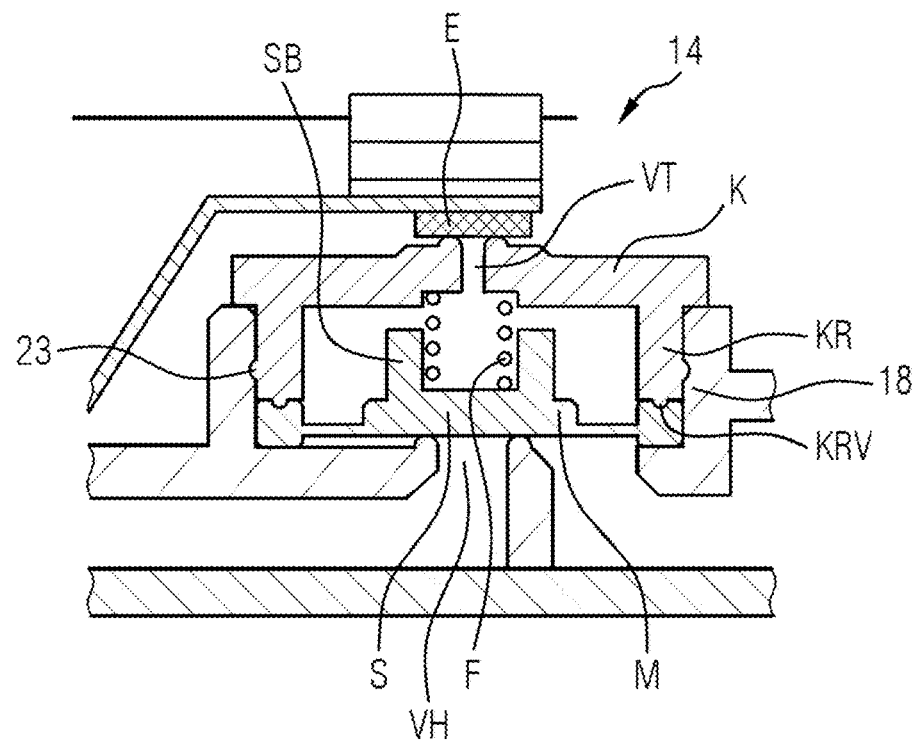
FIG. 7 shows an exemplary valve chamber with a variant of the membrane-plunger connection.
Figure 8:
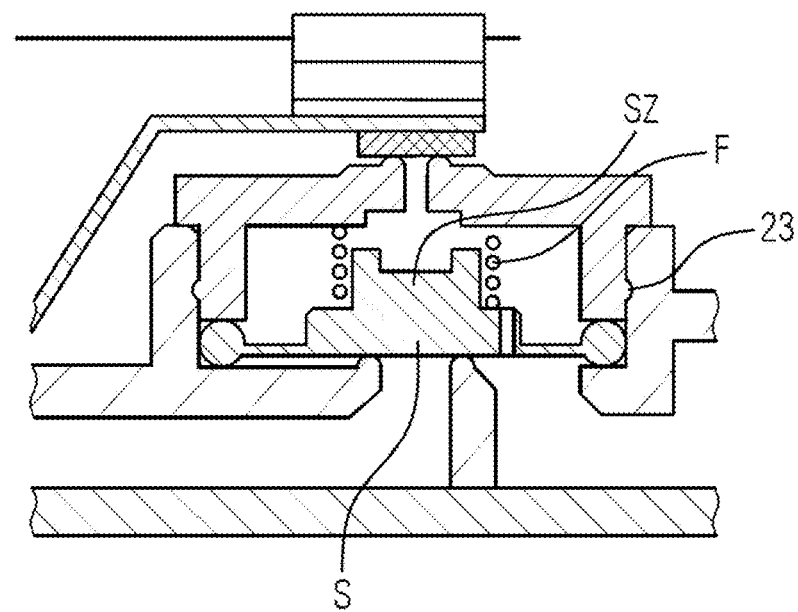
FIG. 8 shows an exemplary valve chamber with a variant of the spring receptacle of the plunger.

The optimized valve designs described below can advantageously also be used:

As is shown in FIGS. 7 and 8, the membrane M can be placed level with the sealing surface on the underside of the plunger S. This has the advantage that the plunger S is guided more precisely in its lower position and is less susceptible to possible tilting.

The cover element K can advantageously have, by means of a lateral protrusion 23, a mechanical stop during the installation (e.g. pressing in) in the cup of the valve chamber 14.

The vertical position of the nozzle seat of the trigger opening VT is thus precisely maintained and at the same time the bead at the outer edge of the membrane M is clamped in a defined manner. This avoids unnecessary tolerances in the mechanical and pneumatic properties of the pneumatic valve.

For sealing the membrane M in relation to the cover element K, the latter may also have a narrow annular elevation or a projection KRV, which presses into the edge of the membrane M and thus seals the latter (FIG. 7).

The elastic element F can be guided not only in a hollow cylinder SB of the plunger S, but alternatively also through a pin-shaped extension SZ of same, as is illustrated in FIG.

8. This pin-shaped extension SZ can advantageously also serve as an upper end stop of the plunger and, on its top side, has a corresponding notch which, in the upper position of the plunger, still allows working air to escape from the second region 2 of the valve chamber 14 through the nozzle seat of the trigger opening VT.

Some of the advantages of some of the above-mentioned embodiments compared to other solutions are:

A single SMA actuator 16 subjected to a low load can, by means of the servo function, actuate a large valve cross section for the filling. This increases the service life of the actuator 16. In addition, there is no need for valves which are connected in parallel, as a result of which installation space and costs can be reduced.

In the inoperative position, the servo valve does not consume any working air.

The servo control functions in a wide pressure range of the preliminary pressure.

The servo valve can be easily extended with another SMA actuator to form a 3/3 NC and NO valve.

The SMA actuator 16 and the associated printed circuit board 17 with electronics are not located in the pressure range and therefore do not have to be sealed either.

The invention claimed is:

1. A pneumatic valve comprises:
   a fluid supply port,
   a fluid outlet port,
   a fluid drainage opening,
   a valve chamber with a fluid supply opening connected to the fluid supply port, a fluid outlet opening connected to the fluid outlet port, and a trigger opening connected to an actuator chamber of the valve with the fluid drainage opening,
   an actuator formed with an SMA wire, comprising an actuating element, a resetting element, and with a printed circuit board arranged in the actuator chamber,
      wherein a sealing element is arranged on the actuating element, said sealing element being pressed against the trigger opening by the resetting element in a unactuated state of the actuator and opening up the trigger opening in an actuated state of the actuator, and
   a membrane dividing the valve chamber into a first region connected to the trigger opening and a second region connected to the fluid outlet opening,
      wherein the membrane is connected to a plunger which, using a spring force in the unactuated state of the actuator, is pressed against and closes the fluid outlet opening, in the actuated state of the actuator, is pushed away from the fluid outlet opening by a fluid flowing through the fluid supply opening and opens up the fluid outlet opening, and
      wherein the membrane has at least one passage opening through which fluid can flow from the first region into the second region, the passage opening having a smaller cross section than the trigger opening.

2. The pneumatic valve as claimed in claim 1, wherein the valve chamber is formed with a cover element having the trigger opening.

3. The pneumatic valve as claimed in claim 2, wherein the spring force applied to the plunger is generated by a spiral spring arranged between the plunger and the cover element.

4. The pneumatic valve as claimed in claim 2, wherein the membrane is clamped between the cover element and a cup-shaped element of the valve chamber receiving the cover element.

5. The pneumatic valve as claimed in claim 4, wherein the cover element has a projection at its edge which is in contact with the membrane.

6. The pneumatic valve as claimed in claim 1, wherein the actuating element is as a leaf spring with a bending section and an actuating section.

7. The pneumatic valve as claimed in claim 6, in which the bending section and the actuating section of the leaf spring are each arranged on opposite sides of the printed circuit board.

8. The pneumatic valve as claimed in claim 1, wherein, in a region next to the trigger opening, the valve chamber has a web against which the region of the membrane, in which the passage opening is situated, is pressed by the fluid flowing in the actuated state of the actuator.

9. The pneumatic valve as claimed in claim 1, wherein the membrane is connected integrally to the plunger.

10. The pneumatic valve as claimed in claim 1, wherein a cross section of the trigger opening is smaller than the cross section of the fluid outlet opening.

11. The pneumatic valve as claimed in claim 1, wherein a cross section of the fluid supply opening is larger than the cross section of the fluid outlet opening.

12. The pneumatic valve as claimed in claim 1, wherein an effective area of the membrane is larger than the cross section of the fluid outlet opening.

13. The pneumatic valve as claimed in claim 1, wherein the fluid outlet opening of the valve chamber is connected to the fluid outlet port via a second valve element.

14. The pneumatic valve as claimed in claim 13, in which the second valve element is open in its unactuated state, and therefore the pneumatic valve is a 3/3 NO valve.

15. The pneumatic valve as claimed in claim 13, in which the second valve element is closed in its unactuated state, and therefore the pneumatic valve is a 3/3 NC valve.

* * * * *